(12) United States Patent
Ishii

(10) Patent No.: US 10,482,351 B2
(45) Date of Patent: Nov. 19, 2019

(54) FEATURE TRANSFORMATION DEVICE, RECOGNITION DEVICE, FEATURE TRANSFORMATION METHOD AND COMPUTER READABLE RECORDING MEDIUM

(71) Applicant: NEC Corporation, Minato-ku, Tokyo (JP)

(72) Inventor: Masato Ishii, Tokyo (JP)

(73) Assignee: NEC CORPORATION, Tokyo (JP)

(*) Notice: Subject to any disclaimer, the term of this patent is extended or adjusted under 35 U.S.C. 154(b) by 11 days.

(21) Appl. No.: 15/545,769

(22) PCT Filed: Feb. 5, 2016

(86) PCT No.: PCT/JP2016/000592
§ 371 (c)(1),
(2) Date: Jul. 24, 2017

(87) PCT Pub. No.: WO2016/125500
PCT Pub. Date: Aug. 11, 2016

(65) Prior Publication Data
US 2018/0018538 A1 Jan. 18, 2018

(30) Foreign Application Priority Data
Feb. 6, 2015 (JP) ................. 2015-022400

(51) Int. Cl.
*G06K 9/62* (2006.01)
*G06K 9/68* (2006.01)
(Continued)

(52) U.S. Cl.
CPC ....... *G06K 9/6215* (2013.01); *G06K 9/00624* (2013.01); *G06K 9/62* (2013.01);
(Continued)

(58) Field of Classification Search
CPC .... G06K 9/00624; G06K 9/62; G06K 9/6215; G06K 9/6247; G06K 9/6279; G06K 9/68;
(Continued)

(56) References Cited

U.S. PATENT DOCUMENTS 5,754,681 A   5/1998 Watanabe et al.
5,963,667 A * 10/1999 Hashimoto ............. G06K 9/74
                                                          382/190
(Continued)

FOREIGN PATENT DOCUMENTS

JP    H08-106295 A    4/1996
JP    2010-092266 A   4/2010

OTHER PUBLICATIONS

B. Gong et al., "Geodesic Flow Kernel for Unsupervised Domain Adaptation," IEEE Conference on Computer Vision and Pattern Recognition (CVPR), pp. 2066-2073, 2012.
(Continued)

*Primary Examiner* — Kim Y Vu
*Assistant Examiner* — Michael Vanchy, Jr.

(57) ABSTRACT

Provided are a feature transformation device and others enabling feature transformation with high precision.
The feature transformation device includes receiving means for receiving training data and test data each including a plurality of samples, optimization means for optimizing weight and feature transformation parameter based on an objective function related to the weight and the feature transformation parameter, the optimization means including weight derivation means for deriving the weight assigned to each element included in the training data and feature transformation parameter derivation means for deriving the feature transformation parameter that transforms each of the samples included in the training data or the test data, objective function derivation means for deriving a value of the objective function, the objective function derivation
(Continued)

means including a constraint determination means for determining whether the weight satisfies a prescribed constraint and regularization means for regularizing at least one of the weight or the feature transformation parameter, and transformation means for transforming an element included in at least one of the training data or the test data based on the feature transformation parameter.

9 Claims, 7 Drawing Sheets

(51) Int. Cl.
*G06N 99/00* (2019.01)
*G06N 20/00* (2019.01)
*G06K 9/00* (2006.01)
*G06N 20/10* (2019.01)

(52) U.S. Cl.
CPC ......... *G06K 9/6247* (2013.01); *G06K 9/6279* (2013.01); *G06K 9/68* (2013.01); *G06K 9/6807* (2013.01); *G06N 20/00* (2019.01); *G06N 20/10* (2019.01); *G06N 99/00* (2013.01)

(58) Field of Classification Search
CPC .. G06K 9/6807; G06K 2209/05; G06K 9/623; G06K 9/6234; G06K 9/6256; G06K 9/6257; G06N 99/00; G06N 99/005
See application file for complete search history.

(56) References Cited

U.S. PATENT DOCUMENTS

| | | | |
|---|---|---|---|
| 2007/0162406 A1* | 7/2007 | Lanckriet | G06K 9/6262 706/20 |
| 2009/0116765 A1* | 5/2009 | Bystrov | G06T 7/33 382/294 |
| 2012/0203717 A1* | 8/2012 | Xu | G06N 99/005 706/12 |

OTHER PUBLICATIONS

International Search Report for PCT Application No. PCT/JP2016/000592, dated Apr. 26, 2016.

English translation of Written opinion for PCT Application No. PCT/JP2016/000592.

* cited by examiner

FEATURE TRANSFORMATION DEVICE, RECOGNITION DEVICE, FEATURE TRANSFORMATION METHOD AND COMPUTER READABLE RECORDING MEDIUM

TECHNICAL FIELD

The present invention relates to a feature transformation device, a recognition device, a feature transformation method and a computer readable recording medium.

BACKGROUND ART

Statistical machine learning technique is used in various fields. In statistical machine learning, by using training data including a plurality of samples each of which is assigned a correct class that is contents indicated by the sample, learning of statistical characteristics of the leaning data and the class is performed based on a model. The training data are collected beforehand in advance of the learning. Then, by applying the model to test data including a plurality of samples each of which is not assigned the above-mentioned correct class, results of prediction, recognition or other results with respect to the test data are acquired.

Pattern recognition technique is one of the fields in which machine learning is used. In the pattern recognition technique, a class to which an input pattern belongs is estimated. An example of the pattern recognition technique includes object recognition which is technique for estimating an object included in an image, voice recognition which is technique for estimating contents of utterance, or the like.

It is assumed in most of the machine learning method that statistical characteristics of the training data and statistical characteristics of the test data are coincident each other. In other words, in the case that the above-mentioned two characteristics are different each other, there is a possibility that precision of the machine learning may be deteriorated. Therefore, technique which is called domain adaptation for cancelling the difference between the above-mentioned two characteristics is proposed.

A patent literature (PTL) 1 describes a learning device and the like. The learning device described in PTL 1, performs learning of a prediction model which is used for predicting an output of test data based on importance that is a ratio of generation probability of training data, which are input data of training sample data, and the test data.

Moreover, a non-patent literature (NPL) 1 describes an technique of performing feature transformation so that training data and test data may have the similar distribution. According to the technique which is described in NPL 1, projection to a subspace group, which is formed by interpolation between subspace where the training data are distributed and subspace where the test data are distributed, is used as the feature transformation.

CITATION LIST

Patent Literature

[PTL 1] Japanese Patent Application Laid-Open Publication No. 2010-92266

Non Patent Literature

[NPL 1] B. Gong, Y. Shi, F. Sha, and K. Grauman, "Geodesic Flow Kernel for Unsupervised Domain Adaptation," IEEE Conference on Computer Vision and Pattern Recognition (CVPR), pp. 2066-2073, 2012

SUMMARY OF INVENTION

Technical Problem

In the learning device described in PTL 1, there may be a case that the number of effective sample data included in the training data is decreased. Moreover, in the technique described in NPL 1, there may be a case that the feature transformation is performed by using unrelated training data when approximating the statistical characteristics of the test data. Therefore, there may be precision of learning is affected when the learning is carried out by using data to which the feature transformation is carried out based on the above-mentioned technologies.

In other words, there is scope for improving precision of the domain adaptation in the technique described in PTL 1 or NPL 1.

The present invention is conceived in order to solve the above-mentioned problem, and a main object of the present invention is to provide a feature transformation device and others which may perform the feature transformation with high precision.

Solution to Problem

A feature transformation device in an aspect of the present invention includes receiving means for receiving training data and test data each including a plurality of samples, optimization means for optimizing weight and feature transformation parameter based on an objective function related to the weight and the feature transformation parameter, the optimization means including weight derivation means for deriving the weight assigned to each element included in the training data and feature transformation parameter derivation means for deriving the feature transformation parameter that transforms each of the samples included in the training data or the test data, objective function derivation means for deriving a value of the objective function, the objective function derivation means including a constraint determination means for determining whether the weight satisfies a prescribed constraint and regularization means for regularizing at least one of the weight or the feature transformation parameter, and transformation means for transforming an element included in at least one of the training data or the test data based on the feature transformation parameter.

A feature transformation method in an aspect of the present invention includes receiving training data and test data each including a plurality of samples, determining whether weight assigned to each element included in the training data satisfies a prescribed constraint, and regularizing at least one of the weight or a feature transformation parameter transforming each of the samples included in the training data or the test data, and deriving a value of the objective function, deriving the weight, deriving the feature transformation parameter, and optimizing the weight and the feature transformation parameter on the basis of an objective function related to the weight and the feature transformation parameter, and transforming an element included in at least one of the training data or the test data based on the feature transformation parameter.

A computer readable recording medium in an aspect of the present invention non-transitorily stores a program which causes a computer to execute a process of receiving training data and test data each including a plurality of samples, a process of deriving weight assigned to each element included in the training data so as to optimize the weight, and a process of deriving a feature transformation parameter transforming each of the samples included in the training data or the test data so as to optimize the feature transformation parameter, and a process of optimizing the weight and the feature transformation parameter based on an objective function related to the weight and the feature transformation parameter, a process of determining whether the weight satisfies a prescribed constraint, a process of regularizing at least one of the weight or the feature transformation parameter, and a process of deriving a value of the objective function, and a process of transforming an element included in at least one of the training data or the test data based on the feature transformation parameter.

Advantageous Effects of Invention

According to the present invention, it is possible to provide the feature transformation device and the like which may carry out the feature transformation with a high degree of precision.

DESCRIPTION OF EMBODIMENTS

An example embodiment and others of the present invention will be described in the following with reference to attached drawings. Firstly, the art of domain adaptation, which forms a base of the feature transformation device in the example embodiment and others of the present invention, will be described. Afterward, the example embodiment and others of the present invention will be explained.

Firstly, the art of domain adaptation will be described. As described above the domain adaptation is a technique, when the statistical characteristics of the training data and the statistical characteristics of the test data are different, for correcting the difference between the above-mentioned two statistical characteristics. In this case, the training data include, for example, one or more samples each having a correct class assigned thereto. The test data includes, for example, one or more samples each of which has no class assigned thereto.

Figure 3:
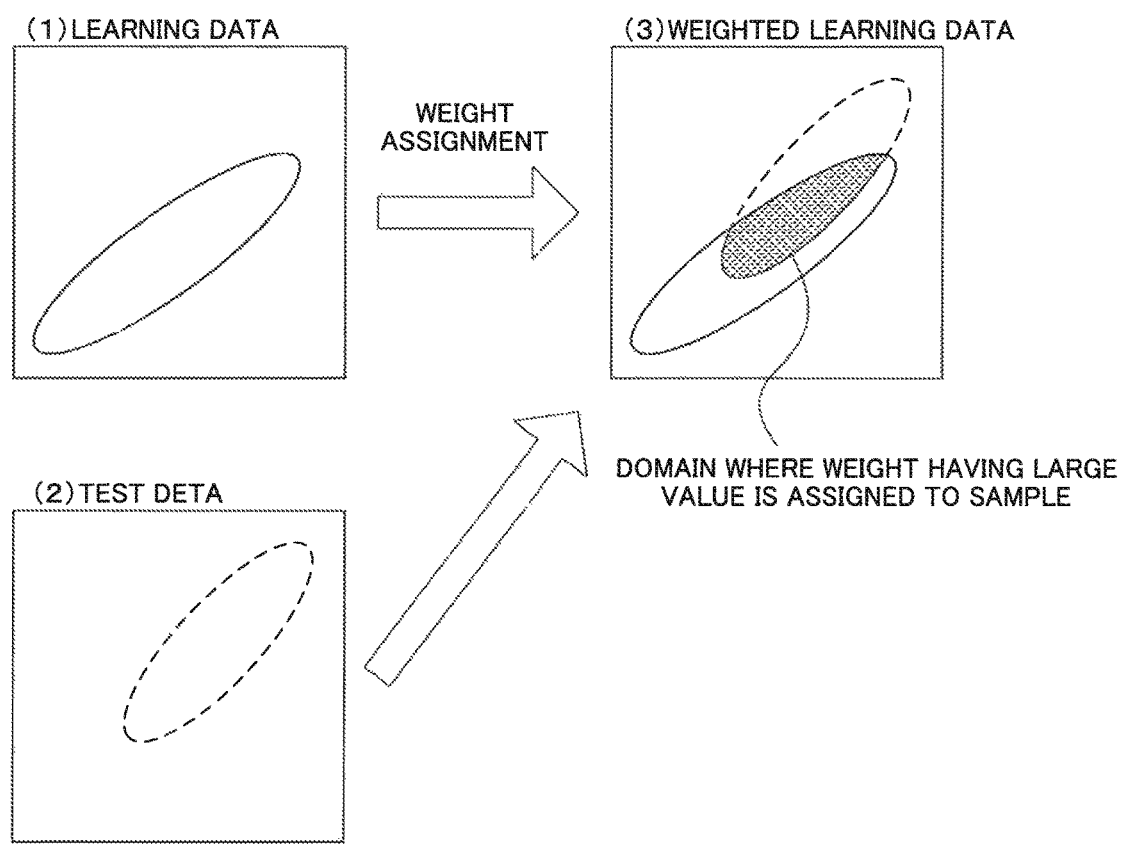
FIG. 3 is a diagram illustrating an example of a case of weighting to each of samples included in training data and test data based on a technique relating to the feature transformation device in the first example embodiment of the present invention.

As one of methods related to the domain adaptation, a method of weighting to each of the samples included in the training data is exemplified. The method is described, for example, in PTL 1 as mentioned above. FIG. 3 is a diagram illustrating examples of the training data and the test data at a time when weighting is performed to each of the samples included in the training data. In the example shown in FIG. 3, an ellipse drawn by a solid line which is shown in FIG. 3 (1) as the training data, and an ellipse drawn by a dotted line which is shown in FIG. 3 (2) as the test data express a domain where the samples of the training data are distributed, and a domain where the samples of the test data are distributed respectively.

According to the technique, for example, the weighting is performed so that the weight for the sample of the training data included in domain (a colored domain in FIG. 3 (3) of FIG. 3) where distribution of both the training data and the test data overlap may have a large value. As the weighting is performed, data distribution of the training data approximating the test data can be represented. In FIG. 3 (3), an ellipse drawn by a solid line and an ellipse drawn by a dotted line represent the domain where the samples of the training data or the test data are respectively distributed.

However, in this technique, the weighting may be performed without considering the number of effective samples (samples which are effective when the learning is carried out using the training data). Accordingly, there is a possibility that only a part of samples is weighed heavily. By weighting heavily to only to a part of samples, there is a possibility that the number of the effective samples of the training data is decreased. As a result, there is a case that the learning is negatively affected when the learning using the training data is performed.

Figure 4:
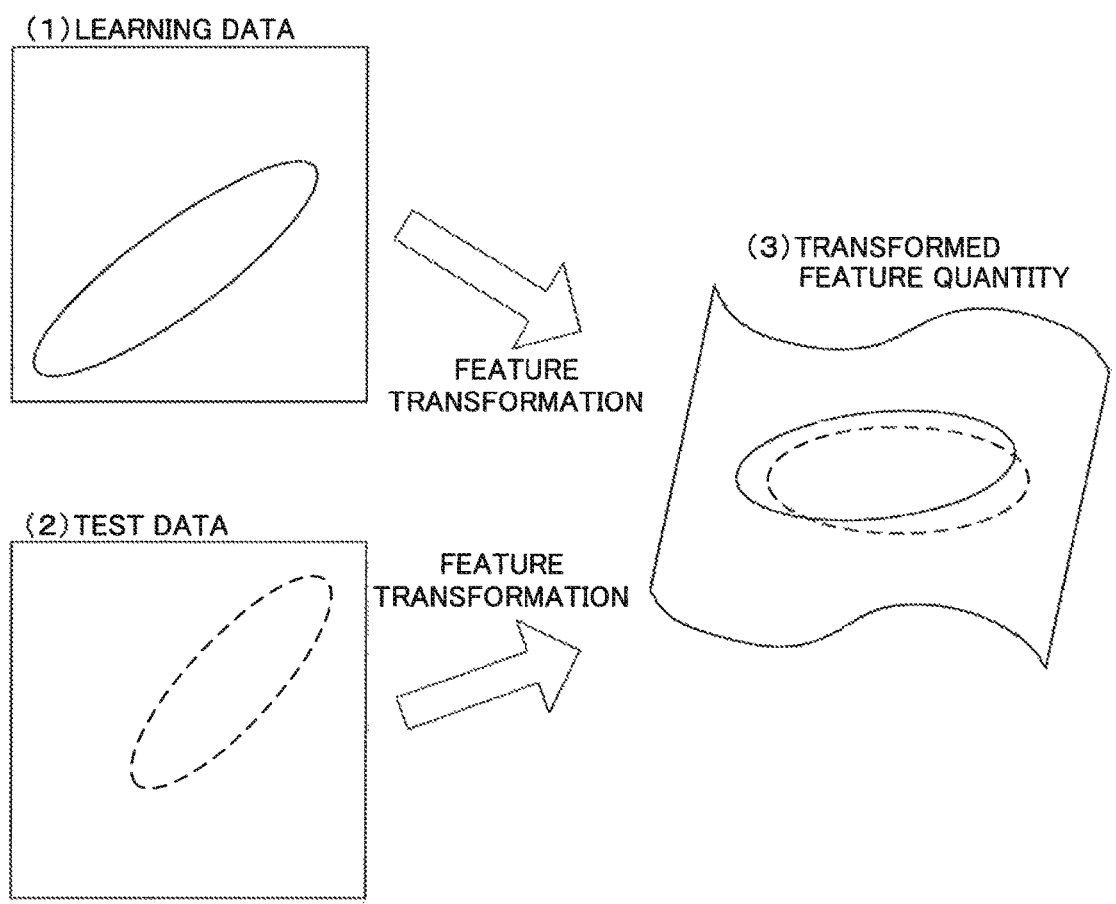
FIG. 4 is a diagram illustrating an example of performing feature transformation to the training data and other data based on the technique relating to the feature transformation device in the first example embodiment of the present invention.

Another method related to the domain adaptation is a method of performing the feature transformation to at least one of the training data the test data so that distribution of the training data and that the test data are approximated each other (that is, may have similar distribution). The method is described in NPL 1 as mentioned above, for example. FIG. 4 is a diagram illustrating examples of the training data and the test data at a time when the feature transformation is performed to each of the training data and the test data. In the example illustrated in FIG. 4, an ellipse drawn by a solid line illustrated in FIG. 4 (1) as the training data, and an ellipse drawn by a dotted line which is illustrated in FIG. 4 (2) as the test data represent a domain where the samples of the training data the samples of the test data are distributed respectively.

In the method, the distribution of the training data and the test data become similar as illustrated in FIG. 4 (3) by performing the feature transformation. Therefore, in the example, the test data can be approximated by the training data which is transformed. Similarly to FIG. 3 (3), an ellipse drawn by a solid line and an ellipse drawn by a dotted line in FIG. 4 (3) represent a domain where the sample of the training data are distributed, and a domain where the samples of the test data are distributed respectively.

However, in the method, there is a case that all of the sample data included in the training data are uniformly used to perform the feature transformation. Thus, when the feature transformation is carried out, the sample of the training data which is not necessary to approximate the statistical characteristics of the test data may be used. When such the feature transformation is carried out, it may be difficult to carry out the accurate domain adaptation.

In contrast, the feature transformation device in the first example embodiment and other examples of the present invention uses both of the weighting method as described above and the feature transformation method. In other words, the feature transformation device in the first example embodiment and other examples of the present invention obtain the weight of the training data and the feature transformation so as to be optimized with respect to the same objective function. Moreover, the feature transformation device in the first example embodiment and other examples of the present invention may use an objective function including a regularizer which may equalize the weight of the training data. By doing the above, it may become possible to perform the feature transformation such that the statistical characteristics of the training data and the test data are approximated each other, while the number of the effective sample data included in the training data to which the domain adaptation is carried out can be increased.

Figure 5:
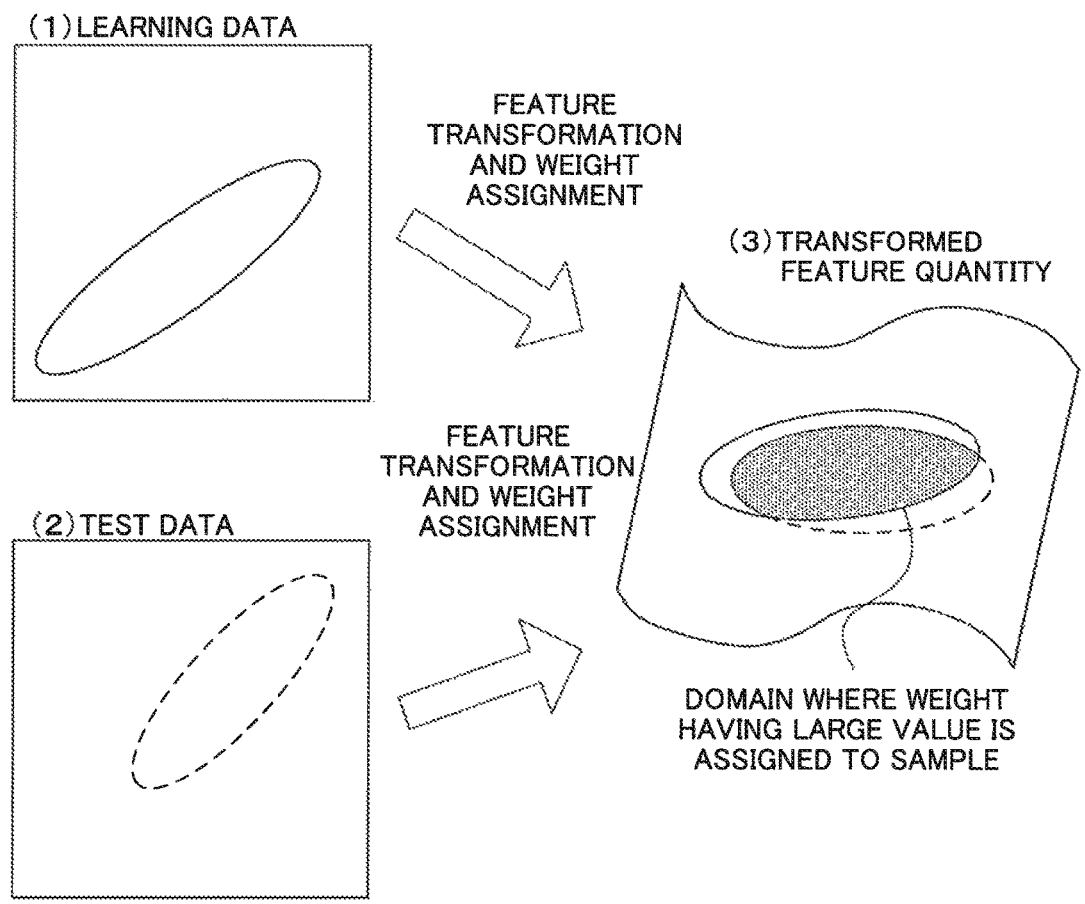
FIG. 5 is a diagram illustrating an example of a case that feature transformation weighting to the training data and the test data by the feature transformation device in the first example embodiment of the present invention.

FIG. 5 is a diagram illustrating an example of the training data and the test data at a time when the weighting and the feature transformation to both of the training data and the test data are performed. Similarly to FIG. 3 and other figures, in FIG. 5, an ellipse drawn by a solid line illustrated in FIG. 5 (1) as the training data, and an ellipse drawn by a dotted line which is illustrated in FIG. 5 (2) as the test data represent a domain where the samples of the training data or the test data are distributed respectively.

In the method which is used in each example embodiment of the present invention, the weighting and the feature transformation are carried out to both of the training data and the test data. As a result, the training data and the test data becomes a form illustrated in FIG. 5 (3). Similarly to FIG. 3 (3), a domain where the training data are distributed and the test data are distributed overlap is colored in FIG. 5 (3). As illustrated in FIG. 5 (3), the domain where the training data are distributed and the test data are distributed overlap becomes larger in comparison with the overlapping domain illustrated in FIG. 3 (3). In addition, in the method used in each example embodiment of the present invention, the weighting is performed so that the sample of the training data included in the colored domain may be weighted heavily. Similarly to FIG. 3 (3) and FIG. 4 (3), in FIG. 5 (3), an ellipse drawn by a solid line and an ellipse drawn by a dotted line in FIG. 5 (3) represent a domain where the samples of the training data are distributed and the samples of the test data are distributed respectively.

In other words, in the method used in each example embodiment of the present invention, it is possible to enlarge the domain including the sample weighted heavily in comparison with the method based on only the weighting illustrated in FIG. 3 (3). This indicates that the number of the effective samples of the training data is increased.

Further, in the method in each example embodiment of the present invention, the sample data included in a domain where the distribution of the training data and the test data do not overlap is weighted small, in comparison with the method based on only the weighting illustrated in FIG. 4 (3), based on only the feature transformation. This indicates that it is possible to carry out the efficient domain adaptation.

Figure 7:
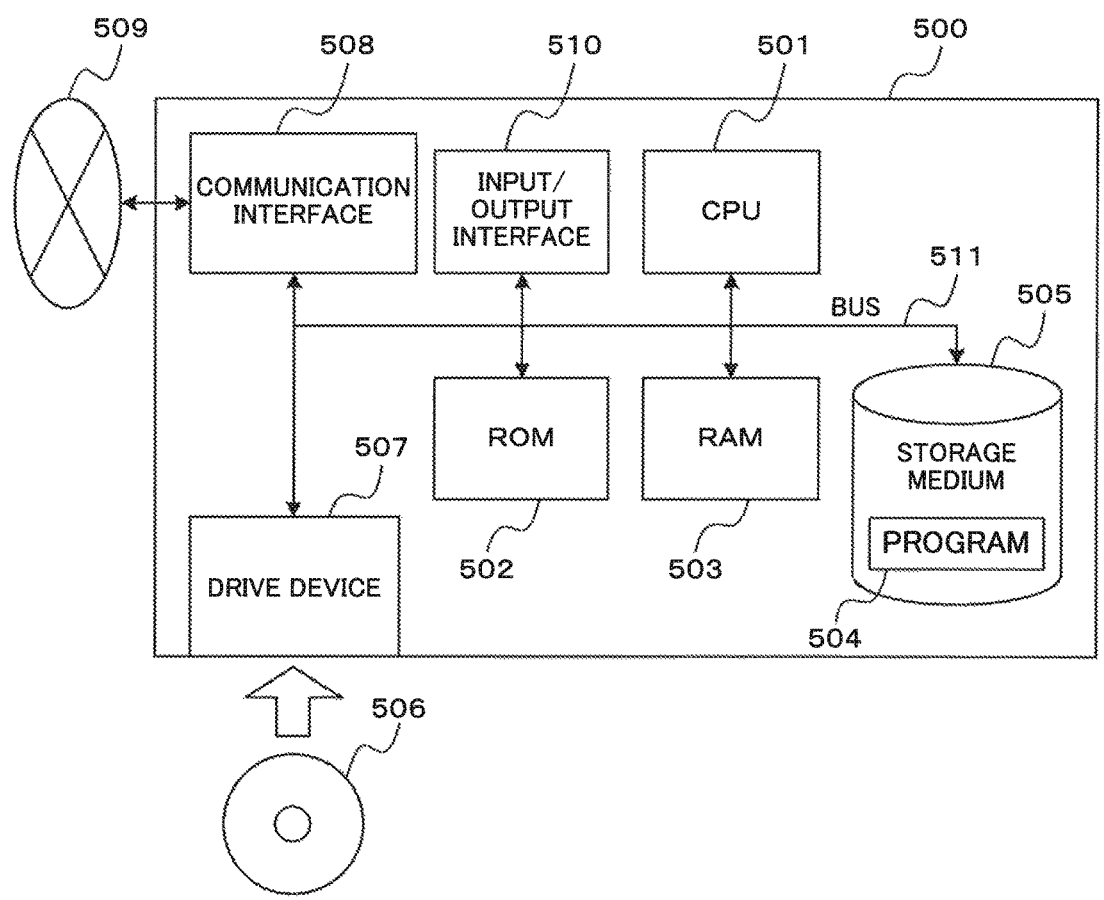
FIG. 7 is an example of an information processing device which achieves the feature transformation devices and others in the example embodiment and the example of the present invention.

Next, the example embodiment and other examples of the present invention will be explained. In the example embodiment of the present invention, each component of each device is represented as a block in a function unit. Each component of each device can be achieved, for example, by any combination of an information processing device 500 and software as illustrated in FIG. 7. The information processing device 500 includes the following components as an example.

CPU (Central Processing Unit) 501
    ROM (Read Only Memory) 502
    RAM (Random Access Memory) 503
    Program 504 which is loaded into RAM 503
    Storage unit 505 which stores the program 504
    Drive device 507 which carries out reading/writing from/into a recording medium 506
    Communication interface 508 which is connected with a network 509
    Input/output interface 510 which inputs/outputs data
    Bus 511 which connects components each other A method for achieving each device has various modifications. For example, each device can be achieved as a dedicated device. Moreover, each device can be achieved by combining a plurality of devices.

In the drawings illustrating the configuration and others of each example embodiment of the present invention, a direction of arrow indicates an example of a direction of data flow. However, the direction of data flow is not limited to the direction of the arrow illustrated in the drawing.

Moreover, a part of or a whole of each component of each device is achieved by general purpose or dedicated circuitry, a processor or the like, or a combination of the circuitry and the processor or the like. A part of or a whole of each component of each device may be achieved by a single chip, and may be realized by a plurality of chips each of which are connected each other through a bus. A part of or a whole of each component of each device may be achieved by a combination of the above-mentioned circuitry and a program.

When a part of or a whole of each component of each device is achieved by a plurality of information processing devices, circuitries, and others, the plurality of information processing devices, the circuitries, and others may be in a form of concentrated arrangement or distributive arrangement. For example, the information processing device, the circuitry, and others may be achieved in a form that each is connected through a communication network like client and server system, cloud computing system, or other systems.

First Example Embodiment

Figure 1:
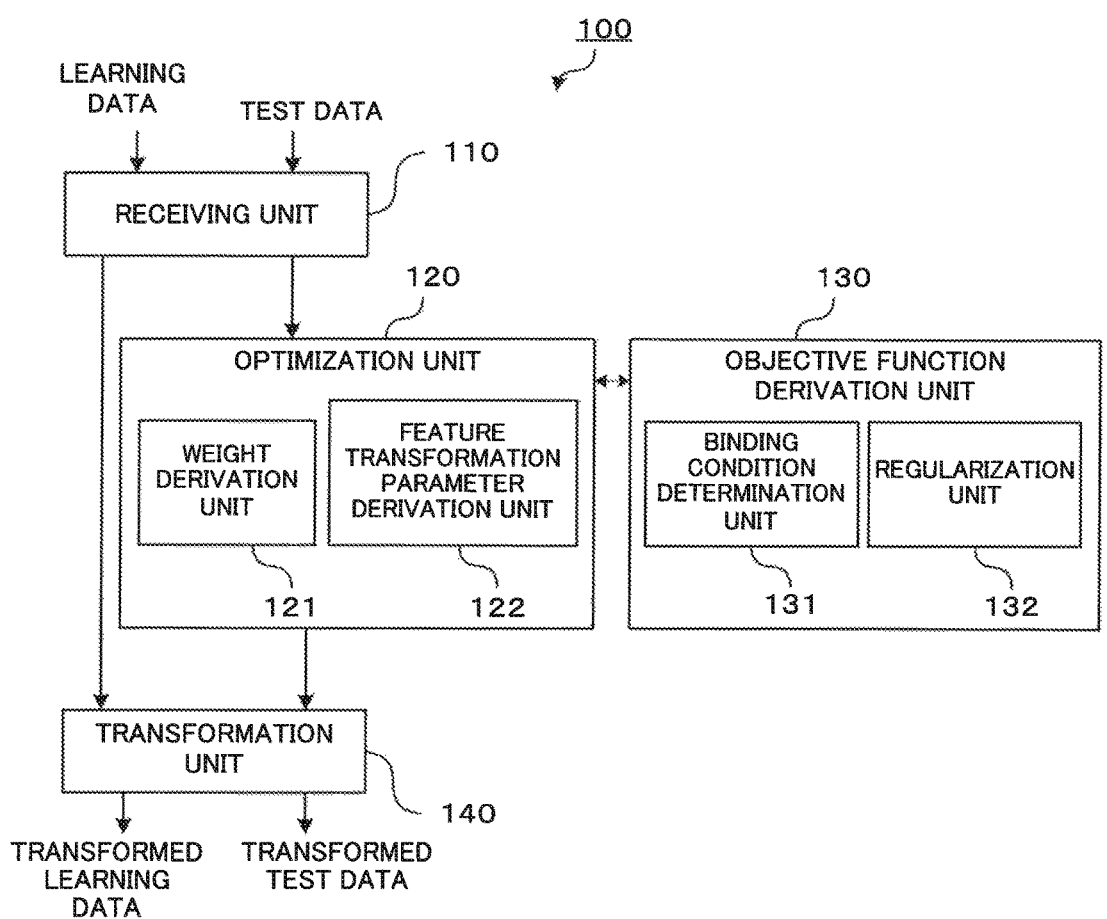
FIG. 1 is a diagram illustrating a configuration of a feature transformation device in a first example embodiment of the present invention.
Figure 2:
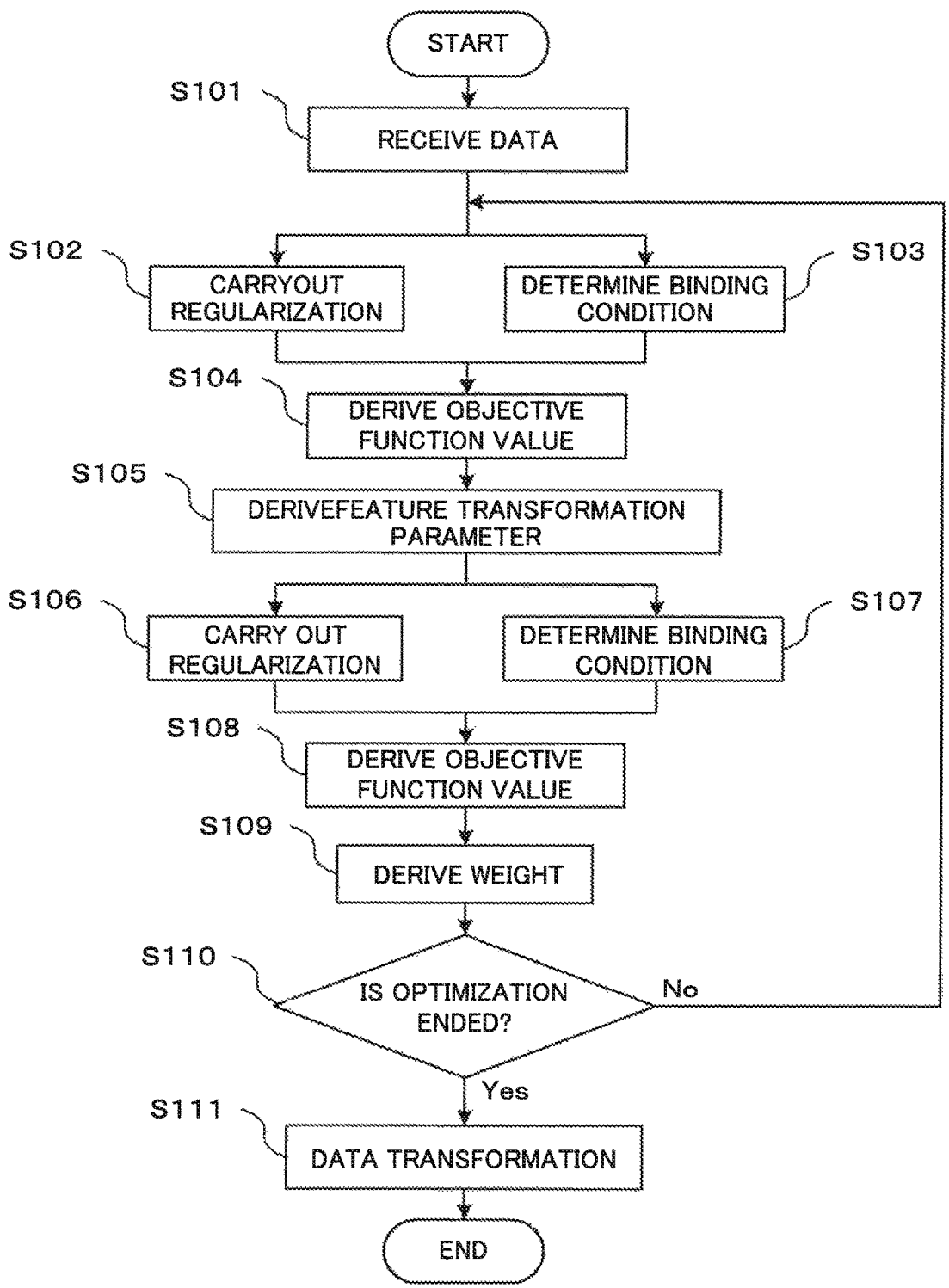
FIG. 2 is a flowchart illustrating an example of an operation of the feature transformation device in the first example embodiment of the present invention.

Firstly, a first example embodiment of the present invention will be explained. FIG. 1 is a diagram illustrating a configuration of a feature transformation device in the first example embodiment of the present invention. FIG. 2 is a flowchart illustrating an example of an operation of the feature transformation device in the first example embodiment of the present invention. FIG. 7 is an example of an information processing device which achieves the feature transformation device and others in the example embodiment and the example of the present invention.

As illustrated in FIG. 1, the feature transformation device in the first example embodiment of the present invention includes a feature transformation device 100, a receiving unit 110, an optimization unit 120, an objective function derivation unit 130, a constraint determination unit 131, a regularization unit 132 and a transformation unit 140. The optimization unit 120 includes a weight derivation unit 121 and a feature transformation parameter derivation unit 122. The objective function derivation unit 130 includes the constraint determination unit 131 and the regularization unit 132.

The receiving unit 110 receives training data and test data. The optimization unit 120 optimizes weight and a feature transformation parameter based on an objective function related to the weight and the feature transformation parameter. The weight derivation unit 121 in the optimization unit 120 derives the weight assigned to each element included in the training data. Moreover, the feature transformation parameter derivation unit 122 derives the feature transformation parameter which transforms each element included in the training data or the test data. The objective function derivation unit 130 derives a value of the objective function as mentioned above. The constraint determination unit 131 in the objective function derivation unit 130 determines whether the weight satisfies a prescribed constraint related to the weight.

Moreover, the regularization unit 132 regularizes at least one of the weight or the feature transformation parameter. The transformation unit 140 transforms the element included in at least one of the training data or the test data based on the feature transformation parameter.

Next, each component of the feature transformation device 100 in the present example embodiment will be described.

The receiving unit 110 receives the training data and the test data. The training data and the test data received by the receiving unit 110 are stored in a storage means or other means which is not illustrated in the drawings.

In the present example embodiment, the training data include, for example, one or more samples each of which is assigned a correct class. The test data include, for example, one or more samples each of which is not assigned the correct class. When the training data and the test data are related to recognition of an object included in an image, for example, the sample included in the training data and the test data forms a feature vector which describes a feature quantity extracted from the image such as the SIFT (Scale-Invariant Feature Transform) feature quantity, or others. In this case, a class assigned to the training data is, for example, a name of the object included in the image.

Each of the training data and the test data which are received by the receiving unit 110 may be data different from the above-mentioned example. For example, the receiving unit 110 may receive the training data including the sample which is not assigned the correct class, and the test data including the sample which is assigned the correct class. Alternatively, the receiving unit 110 may receive the training data including the sample which is not assigned the correct class, and the test data including the sample which is not assigned the correct class. The sample included in the training data and the test data may be in any form which is different from the feature vector, in accordance with kinds or others of the information which each of the sample indicates.

The optimization unit 120 optimizes the weight and the feature transformation parameter based on the objective function related to the weight and the feature transformation parameter. The optimization unit 120 includes the weight derivation unit 121 and the feature transformation parameter derivation unit 122.

In the present example embodiment, the weight is a value determined for each of the sample included in the training data, and indicates importance of the sample when approximating the test data. When the sample included in the training data is the feature vector as described above, the weight is a scalar value determined for each of the feature vector. In this case, the weight having a large value represents that the feature vector is important for approximating the test data.

The feature transformation parameter is a parameter indicating a degree of the feature transformation when the feature transformation to the training data and other data is performed. When the sample included in the training data is the feature vector as described above, the feature transformation parameter is represented as a matrix. Then, by multiplying the matrix by the feature vector, the feature transformation is carried out.

The optimization unit 120 performs optimization based on a predetermined objective function. As an example, when the learning related to recognition of an object included in an image is performed, an objective function L represented by the following Equation (1) is used as the objective function. When the objective function L represented by the following Equation (1) is used as the objective function, the optimization as described above is performed so as to minimize a value of the objective function L represented by Equation (1).

[Equation 1]

$$L(\theta, w) = \sum_{x_i \in D_S} w_i \|x_i - g_\theta(f_\theta(x_i))\|^2 + \sum_{x_i \in D_T} \|x_i - g_\theta(f_\theta(x_i))\|^2 + R(w) \quad (1)$$

In the Equation (1) as denoted above, x represents the feature vector which is the sample included in the training data or the test data, $D_S$ represents the training data, and $D_T$ represents the test data. Moreover, w represents the weight, θ represents the feature transformation parameter, $f_\theta$ represents an operation related to the feature transformation, $g_\theta$ represents an operation related to inverse transformation from a transformed feature to an original feature and R represents and a convex function for regularizing the weight.

The objective function represented by the Equation (1) as denoted above minimizes the L2 norm, which represents a difference between a value acquired by inversely transforming the transformed feature and the original feature, in a first term and a second term of Equation (1). The objective function represented by Equation (1) is an example of criterion used in the learning of the feature transformation. However, the objective function may be freely determined by using a different form from the form of Equation (1), in accordance with information indicated by the training data and the test data, or others. For example, the objective function may be a correlation function.

The optimization unit 120 alternately repeats optimization of the weight by the weight derivation unit 121, and optimization of the feature transformation parameter by the feature transformation parameter derivation unit 122, for example.

The weight derivation unit 121 in the optimization unit 120 obtains the weight as described above. More specifically, the weight derivation unit 121 obtains the weight which is optimized regarding the above-mentioned objective function. In the present example embodiment, the objective function represented by Equation (1) is a convex function with respect to the weight. Therefore, the weight derivation unit 121 optimizes the weight based on a method such as the sub-gradient method, the internal point method or other methods each of which is usually used when optimizing the convex function.

The feature transformation parameter derivation unit 122 in the optimization unit 120 obtains the feature transformation parameter as described above. More specifically, the feature transformation parameter derivation unit 122 obtains the feature transformation parameter which is optimized with respect to the objective function.

With respect to the example of the present example embodiment, a constraint described in a term of the constraint determination unit 131 which will be described later is not determined. Thus, the feature transformation parameter derivation unit 122 can optimize the feature transformation parameter based on a method such as the subgradient method, or other methods, which is usually used when optimizing the feature transformation parameter.

The objective function derivation unit 130 obtains an objective function value. The objective function derivation unit 130 includes the constraint determination unit 131 and the regularization unit 132.

The objective function derivation unit 130 derives the objective function value based on the value of the weight and the feature transformation parameter at a time of obtaining the objective function. Moreover, the objective function derivation unit 130 may together derive information required when optimizing the weight and the feature transformation parameter (for example, gradient).

The constraint determination unit 131 in the objective function derivation unit 130 determines whether the weight satisfies a predetermined constraint. A condition that each weight has a nonnegative value and that a sum of the weight is a predetermined value is used as an example of the constraint. When the learning on recognition of the object included in the image is performed, the constraint is represented as the following Equation (2).

[Equation 2]

$$\sum_i w_i = C, \forall i w_i \geq 0 \qquad (2)$$

In the Equation (2) as denoted above, C is a predetermined constant. When a large value is set to C, a larger weight is assigned the sample of the training data. In other words, by setting such a large value to C, the optimization unit 120 and the weight derivation unit 121 optimize the weight so that the training data may be considered to be important, and consequently obtain the optimized weight. On the other hand, when a small value is set to C, a smaller weight is assigned the sample of the training data. In other words, by setting such a large value to C, the optimization unit 120 and the weight derivation unit 121 optimize the weight so that the test data may be considered to be important, and consequently obtain the optimized weight.

When the constraint determination unit 131 determines that the weight does not satisfy the predetermined constraint, for example, the weight derivation unit 121 or other units correct the weight so as to satisfy the constraint.

Alternatively, in this case, the objective function derivation unit 130 may obtain a sufficiently large value in comparison with a value of the objective function which is usually obtained. By doing the above, it is possible to prevent the weight not satisfying the above-mentioned constraint as being derived as an optimal solution.

The constraint determination unit 131 may appropriately use constraints different from Equation (2), in accordance with information represented by the training data, the test data and other data, the form of the objective function, or others.

The regularization unit 132 in the objective function derivation unit 130 regularizes at least one of the weight or the feature transformation parameter. As an example, the regularization unit 132 regularizes the weight by using a convex function so that the optimization unit 120 or other units may perform the optimization easily. In the present example embodiment, for example, when performing the learning on the recognition of the object included in the image, the regularization unit 132 uses a regularization term shown in, for example, the following Equation (3).

[Equation 3]

$$R(w) = \sum_i w_i^2 \qquad (3)$$

As denoted in Equation (1) described earlier, the optimization unit 120 optimizes the weight and the feature transformation parameter so that a value represented by Equation (3) may become small. Meanwhile, as denoted in Equation (2) in the constraint determination unit 131, a sum of the weight value is constant. Therefore, the value represented by Equation (3) is small when the weight assigned to each sample included in the training data is uniform (in other words, a difference between the weight values is small, and is included in a certain range.).

Thus, the feature transformation device 100 in the present example embodiment may equalize the weight, since the objective function derivation unit 130 includes the regularization unit 132, and the regularization term is introduced into the objective function. By virtue of this, it is possible to increase the number of the effective samples included in the training data.

The regularization unit 132 may appropriately use an equation different from Equation (3) as the regularization term, in accordance with the information indicated by the training data, the test data and other data, the form of the objective function, or others.

The transformation unit 140 performs the feature transformation, based on the weight and the feature transformation parameter which are obtained so as to be optimized by the optimization unit 120 and the feature transformation parameter derivation unit 122, to at least one of the training data or the test data. The transformation unit 140 performs the feature transformation by using $f_\theta$ as described earlier.

The transformation unit 140 may output the training data or the test data, to which the feature transformation is performed, to any kind of storage means, a communication network, or any kind of display means both of which are not illustrated in the drawing, or others. As an example, the transformation unit 140 may output only $f_\theta$ (x) (x represents the feature vector which is the sample included in the training data or the test data) to which the feature transformation is performed. Moreover, with respect to the training data, the transformation unit 140 may output both of the training data to which the feature transformation is performed, and the weight which is related to the training data.

Here, the transformation unit 140 may output the feature transformation parameter and the weight so that other devices may perform the feature transformation as described above. In this case, the transformation unit 140 may output the feature transformation parameter and the weight together with the training data and the test data to which the feature transformation is performed, or may output only the feature transformation parameter and the weight.

Next, an example of an operation of the feature transformation device 100 in the present example embodiment will be described with reference to FIG. 2.

Firstly, the receiving unit 110 receives the training data and the test data (Step S101). The training data and the test data received are stored appropriately in a storage means which is not illustrated in the drawing. In this step, the receiving unit 110 or other units may determine the initial weight or the initial feature transformation parameter.

Next, the feature transformation device 100 carries out a series of processes so as to obtain the optimized feature transformation parameter. In this case, firstly, the constraint determination unit 131 of the objective function derivation unit 130 determines whether the weight satisfies the constraint (Step S103). Moreover, the regularization unit 132 carries out the regularization (Step S102). An order of these two steps is freely determined. The objective function derivation unit 130 obtains the objective function value based on the training data and the test data both of which are received in Step S101, the weight, and the feature transformation parameter (Step S104). In this case, the objective function derivation unit 130 obtains the objective function value by using a result in Step S102 or Step S103. Next, the feature transformation parameter derivation unit 122 in the optimization unit 120 obtains the feature transformation parameter so as to optimize the feature transformation parameter for the objective function (Step S105).

Next, the feature transformation device 100 carries out a series of processes so as to obtain the optimized weight. Firstly, the constraint determination unit 131 of the objective function derivation unit 130 determines whether the weight satisfies the constraint again (Step S107). Similarly, the regularization unit 132 performs the regularization (Step S106). Then, the objective function derivation unit 130 obtains the objective function value (Step S108).

A procedure from Step S106 to Step S108 is carried out similarly to the procedure from Step S102 to Step S104 respectively. Next, the weight derivation unit 121 in the optimization unit 120 obtains the weight optimized for the objective function (Step S109).

Next, the optimization unit 120 determines whether to terminate the optimization process (Step S110). For example, when the optimization process is carried out repeatedly by a predetermined number of times, or when it is determined that the prescribed condition related to the objective function is satisfied, based on a convergence of the objective function or other conditions, the optimization unit determines to terminate the optimization process.

When the optimization unit 120 determines to terminate the optimization process, a process of Step S111 is subsequently performed by the transformation unit 140. In particular, the transformation unit 140 performs the feature transformation to at least one of the training data or the test data based on the feature transformation parameter which is obtained in the previous steps. In this step, the transformation unit 140 may output the training data or the test data both of which are transformed to any kind of storage means, the communication network, or any kind of display means or other means not illustrated in the drawing, in accordance with necessity. Moreover, the transformation unit 140 may additionally output the weight which is obtained in the previous steps.

When the optimization unit 120 determines not to terminate the optimization process in Step S110, the feature transformation device 100 returns to Step S102 or S103, and continues the operation. In particular, using the weight and the feature transformation parameter which have been newly obtained in the previous processes, the processes after Step S102 or Step S103 is carried out again. In other words, the feature transformation device 100 in the present example embodiment alternately repeats the derivation of the weight and the feature transformation parameter until, for example, the optimization unit 120 determines to terminate the optimization process.

As described above, the feature transformation device 100 in the first example embodiment obtains the weight and the feature transformation parameter of the training data so that they are optimized with respect to the same objective function. More specifically, the feature transformation device in the first example embodiment and others of the present invention optimizes the weight and the feature transformation of the training data by using the objective function including the regularization term for equalizing the weight of the training data. According to the feature transformation device in the present example embodiment, by doing the above, it is possible to perform the feature transformation so that the statistical characteristics of the training data and the statistical characteristics of the test data may be approximated each other, while increasing the number of the effective sample data included in the training data. Therefore, the feature transformation device in the present example embodiment can perform the feature transformation with high precision.

Moreover, the feature transformation device 100 in the present example embodiment uses, for example, the constraint related to the weight of the training data, and the convex type objective function into which normalization is introduced. For this reason, the optimization of the weight is carried out by using the optimization method which is related to the convex function such as the sub-gradient method or other methods. Moreover, the optimization of the feature transformation parameter is performed by using the general optimization method. Thus, by using the feature transformation device 100 in the present exemplary embodiment, it is possible to easily optimize the weight and the feature transformation parameter of the training data.

Therefore, in the statistical machine learning including the image recognition and the voice recognition, by using the feature transformation device 100 in the present exemplary embodiment, it is possible to improve performance in the learning when applying the training data prepared in advance to actual data.

Application Examples

Figure 6:
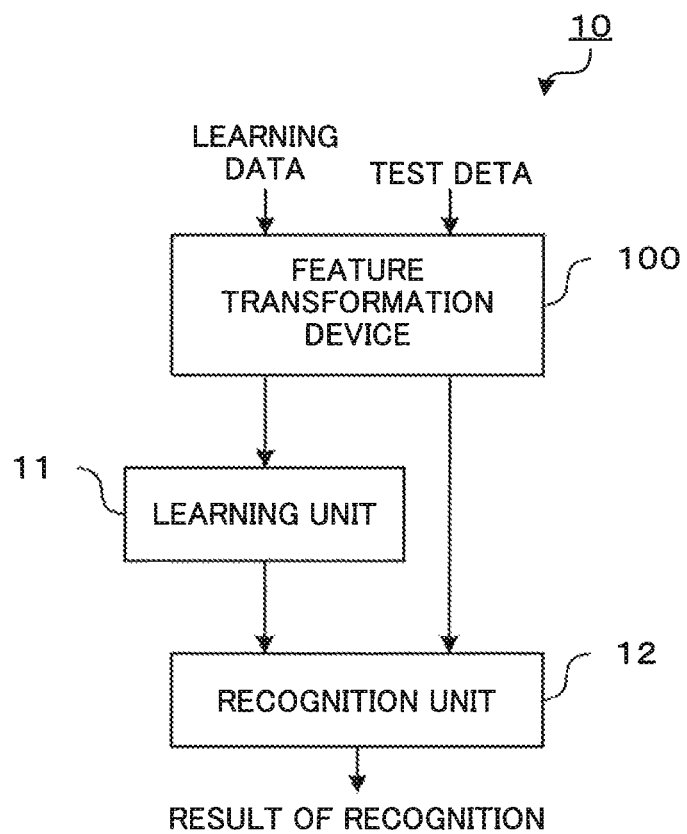
FIG. 6 is a diagram illustrating a configuration of a recognition device in an example of the present invention.

Subsequently, a recognition device 10 which uses the feature transformation device 100 in the first exemplary embodiment of the present invention will be explained with reference to FIG. 6. The recognition device 10 can be used, for example, for the image recognition, the voice recognition, or other recognition. However, the recognition device 10 may be used for other applications.

The recognition device 10 in the present application example includes the feature transformation device 100, a learning unit 11 and a recognition unit 12.

The feature transformation device 100 is identical to the feature transformation device 100 described in the first example embodiment of the present invention. In other words, the feature transformation device 100 performs the feature transformation to the training data and the test data which are inputted. Then, the feature transformation device 100 outputs the training data and the test data, to which the feature transformation is performed, to the learning unit 11 and the recognition unit 12 which will be described later, and outputs the weight of the training data to the learning unit 11 and the recognition unit 12 in accordance with necessity.

Based on the training data to which the feature transformation is performed by the feature transformation device 100, the learning unit 11 performs the learning of a recognition model based on, for example, the support vector machine or other models.

Using the recognition model to which the learning is performed by the learning unit 11. The recognition unit 12 recognizes the test data to which the feature transformation is performed by the feature transformation device 100. The recognition unit 12 outputs a result of the recognition to, for example, any kind of storage means, a communication network, any kind of display means or other means which is not illustrated in the drawing.

The learning unit 11 in the recognition device 10 in the present application example performs the learning of the recognition model based on the training data to which the feature transformation device 100 carries out the feature transformation. Therefore, even when statistical characteristics of the training data prepared in advance are different from statistical characteristics of the test data, the recognition device 10 in the present example of application can generate the learning model with high precision. Therefore, in the case that the recognition device 10 in the present application example is used, for example, for recognition of images or voices, when applying the learning model generated based on the training data prepared in advance to the actual test data, the recognition device 10 can performed the recognition or others with high precision.

While the present invention is described with reference to the example embodiment and the example, the present invention is not limited to the example embodiment as described above. It is possible to add various changes, which those skilled in the art can understand, to the configuration and the details of the present invention within the scope of the present invention. Moreover, the configuration of each example embodiment can be combined with the configurations of the other example embodiments without departing from the scope of the present invention.

This application is based upon and claims the benefit of priority from Japanese Patent Application No. 2015-22400, filed on Feb. 6, 2015, the disclosure of which is incorporated herein in its entirety by reference.

REFERENCE SIGNS LIST

10 Recognition device
100 Feature transformation device
110 Receiving unit
120 Optimization unit
121 Weight derivation unit
122 Feature transformation parameter derivation unit
130 Objective function derivation unit
131 Constraint determination unit
132 Regularization unit
140 Transformation unit

What is claimed is:

1. A feature transformation device, comprising:
    at least one processing component configured to: receive learning data and test data each including a plurality of samples;
    derive weight assigned to each element included in the learning data, derive feature transformation parameter transforming each of the samples included in the learning data and the test data, and optimize the weight and the feature transformation parameter based on an objective function related to the weight and the feature transformation parameter, the transformation parameter is a parameter of a transformation operation;
    determine whether the weight satisfies a prescribed constraint, regularize at least one of the weight or the feature transformation parameter, and derive a value of the objective function; and
    transform an element included in the learning data and the test data based on the feature transformation parameter by using the transformation operation, wherein
    the objective function includes a difference between the training data and data obtained by applying an inverse operation to the transformed learning data and a difference between the test data and data obtained by applying the inverse operation to the transformed test data, the inverse operation being an inverse operation of the transform operation.

2. The feature transformation device according to claim 1, wherein
    the at least one processing component further configured to:
    regularize at least one of the weight or the feature transformation parameter in such a way that a difference between the weights values for each of the plurality of samples included in the learning data, is included in a predetermined range.

3. The feature transformation device according to claim 1, wherein
    the at least one processing component further configured to:
    determine whether the weight for each of the plurality of samples included in the learning data is a nonnegative value, and a sum of the weight satisfies a predetermined condition.

4. The feature transformation device according to claim 1, wherein
    the at least one processing component further configured to:
    receive the learning data in which a correct class that indicates contents represented by the sample is assigned to each of the plurality of samples and the test data in which the correct class is not assigned to each of the plurality of samples.

5. The feature transformation device according to claim 1, wherein
    the at least one processing component further configured to:
    receive the learning data in which a correct class that indicates contents represented by the sample is not assigned to each of the plurality of samples, and the test data in which the correct class is assigned to each of the plurality of samples.

6. The feature transformation device according to claim 1, wherein
    the at least one processing component further configured to:
    receive learning data in which a correct class that indicates contents represented by the sample is not assigned to each of the plurality of samples, and test data in which the correct class is not assigned to each of the plurality of samples.

7. A recognition device, comprising:
    the feature transformation device according to claim 1; and
    at least one processing component configured to:
    perform learning of a recognition model based on the learning data transformed based on the weight and the feature transformation parameter which are derived by the feature transformation device; and perform recognition on the test data based on the recognition model and the test data transformed based on the feature transformation parameter which is derived by the feature transformation device.

8. A feature transformation method, comprising:

receiving learning data and test data each including a plurality of samples;

determining whether weight assigned to each element included in the learning data satisfies a prescribed constraint, regularizing at least one of the weight or a feature transformation parameter transforming each of the samples included in the learning data and the test data, and deriving a value of an objective function, the transformation parameter is a parameter of a transformation operation;

deriving the weight, deriving the feature transformation parameter, and optimizing the weight and the feature transformation parameter based on the objective function related to the weight and the feature transformation parameter; and transforming an element included in the learning data and the test data based on the feature transformation parameter by using the transformation operation, wherein the objective function includes a difference between the training data and data obtained by applying an inverse operation to the transformed learning data and a difference between the test data and data obtained by applying the inverse operation to the transformed test data, the inverse operation being an inverse operation of the transform operation.

9. A non-transitory computer readable recording medium which causes a computer to execute:

a process of receiving learning data and test data each including a plurality of samples;

a process of deriving weight assigned to each element included in the learning data so as to optimize the weight, a process of deriving a feature transformation parameter transforming each of the samples included in the learning data and the test data so as to optimize the feature transformation parameter, and a process of optimizing the weight and the feature transformation parameter based on an objective function related to the weight and the feature transformation parameter, the transformation parameter is a parameter of a transformation operation;

a process of determining whether the weight satisfies a prescribed constraint, a process of regularizing at least one of the weight or the feature transformation parameter, and a process of deriving a value of the objective function; and a process of transforming an element included in the learning data and the test data based on the feature transformation parameter by using the transformation operation, wherein the objective function includes a difference between the training data and data obtained by applying an inverse operation to the transformed learning data and a difference between the test data and data obtained by applying the inverse operation to the transformed test data, the inverse operation being an inverse operation of the transform operation.

* * * * *